(12) United States Patent
Chen et al.

(10) Patent No.: US 7,861,045 B2
(45) Date of Patent: Dec. 28, 2010

(54) MEMORY CONTROL SYSTEM AND METHOD TO READ DATA FROM MEMORY

(75) Inventors: Chien-Chou Chen, Chang Hua (TW); Bin Feng Hung, Tai Pei (TW); Chi-Chang Lu, Hsinchu (TW)

(73) Assignee: Etron Technology, Inc., Hsin Chu (TW)

( * ) Notice: Subject to any disclaimer, the term of this patent is extended or adjusted under 35 U.S.C. 154(b) by 412 days.

(21) Appl. No.: 11/987,879

(22) Filed: Dec. 5, 2007

(65) Prior Publication Data

US 2009/0006779 A1 Jan. 1, 2009

(30) Foreign Application Priority Data

Jun. 27, 2007 (TW) .............................. 96123163 A

(51) Int. Cl.
*G06F 12/00* (2006.01)

(52) U.S. Cl. ................ 711/154; 711/167; 711/E12.002

(58) Field of Classification Search .................. 711/154, 711/167, E12.002
See application file for complete search history.

(56) References Cited

U.S. PATENT DOCUMENTS

| 6,504,635 | B1 * | 1/2003 | Nakashima | .................. 398/25 |
| 2002/0030764 | A1 * | 3/2002 | Kim et al. | .................... 348/731 |
| 2004/0117543 | A1 * | 6/2004 | Thomann et al. | ............ 711/105 |
| 2005/0166004 | A1 | 7/2005 | Campanale et al. | |
| 2007/0186071 | A1 * | 8/2007 | Bellows et al. | ............... 711/167 |
| 2008/0219378 | A1 * | 9/2008 | Aggarwal | .................... 375/298 |

* cited by examiner

*Primary Examiner*—Mardochee Chery
(74) *Attorney, Agent, or Firm*—Muncy, Geissler, Olds & Lowe, PLLC

(57) ABSTRACT

The invention discloses a memory control system and a method to read data from memory. The memory control system comprises a control unit, a storage device, and a microprocessor. The memory control system and the method to read data from memory according to the invention utilize an unbalanced microprocessor clock signal with different duration length to control the microprocessor so as to increase the speed of reading memory.

10 Claims, 5 Drawing Sheets

MEMORY CONTROL SYSTEM AND METHOD TO READ DATA FROM MEMORY

BACKGROUND OF THE INVENTION (a) Field of the Invention

The invention relates to a memory processing device, particularly to a memory control system and a method to read data from memory.

(b) Description of the Related Art

In general, a microprocessor (MCU), has no build-in read-only memory (ROM), and in the past the microprocessor usually reads the ROM code from an externally coupled read-only memory (such as: flash memory) via a parallel bus. Since the current design trend is to integrate the microprocessor and scaler into a single chip, in order to reduce the pin count of the microprocessor, a serial bus is utilized to read the ROM code from the read-only memory. Under the serial bus structure, the microprocessor can only read a single bit of the data within one clock cycle of base band when accessing the ROM code from the read-only memory. Therefore, the processing speed of the microprocessor is seriously reduced.

For example, FIG. 1 illustrates the waveform diagram of a two-period (2T) microprocessor operating in serial transmission mode. In FIG. 1, the label "MCUclk" indicates the processing clock of the microprocessor and the label "xclk" indicates the clock of the system base band. In general, the 2T microprocessor fetches one byte of data from the read-only memory during the first period T0 of the MCUclk. However, in order to fetch eight bits of data, the 2T microprocessor must firstly spend time to decode an eight-bit command and a twenty-four-bit address so that the 2T microprocessor can execute the data (ROM code) during the second period T1 of the MCUclk. As shown in the figure, when fetching and executing the ROM code, the 2T microprocessor needs to spend forty base band clocks xclk to complete each operation, that is, the 2T microprocessor needs eighty base band clocks xclk to complete fetching and executing one byte of data. In general, one command of a microprocessor needs one to four bytes of data. Taking a two-byte command as an example, a 2T microprocessor needs four MCUclks, that is, one hundred and sixty xclks to complete the operation. Therefore, under the serial transmission structure, the time needed for various microprocessors (2T, 6T, 8T MCU, and so forth) to execute a command is greatly extended and the program executing speed of the overall system is limited.

BRIEF SUMMARY OF THE INVENTION

In light of the above-mentioned problem, one object of the invention is to provide a memory control system and a method to read data from memory to increase the speed of reading serial memory for the microprocessor.

The memory control system according to one embodiment of the invention comprises a control unit, a storage device, and a microprocessor. The control unit generates a microprocessor clock signal according to a base band clock signal where the microprocessor clock signal comprises at least one first duration and at least one second duration that is shorter than the first duration. The storage device is to store data corresponding to a plurality of addresses. The microprocessor outputs an address according to the microprocessor clock signal during the first duration, fetches data corresponding to the address during the first duration from the storage device, and executes the operation instructed by the data during the second duration.

Furthermore, one embodiment of the invention provides a method to read data from memory. The method comprises the following steps. At first, a microprocessor clock signal is generated according to a base band clock signal. The microprocessor clock signal comprises at least one first duration and at least one second duration that is shorter than the first duration. Then, an address is outputted during the first duration according to the microprocessor clock signal, the data corresponding to the addresses is fetched from a storage device during the first duration, and the operation instructed by the data is executed during the second duration.

The memory control system and the method to read data from memory according to one embodiment of the invention utilize the unbalanced clock design to control the microprocessor by adjusting the microprocessor clock duration into different duration length so as to greatly increase the speed and the efficiency of fetching data from a serial storage device by the microprocessor and solve the problem in the prior art.

DETAILED DESCRIPTION OF THE INVENTION

The memory control system and the method to read data from memory according to the invention are described in details with reference to the drawings.

Figure 1:
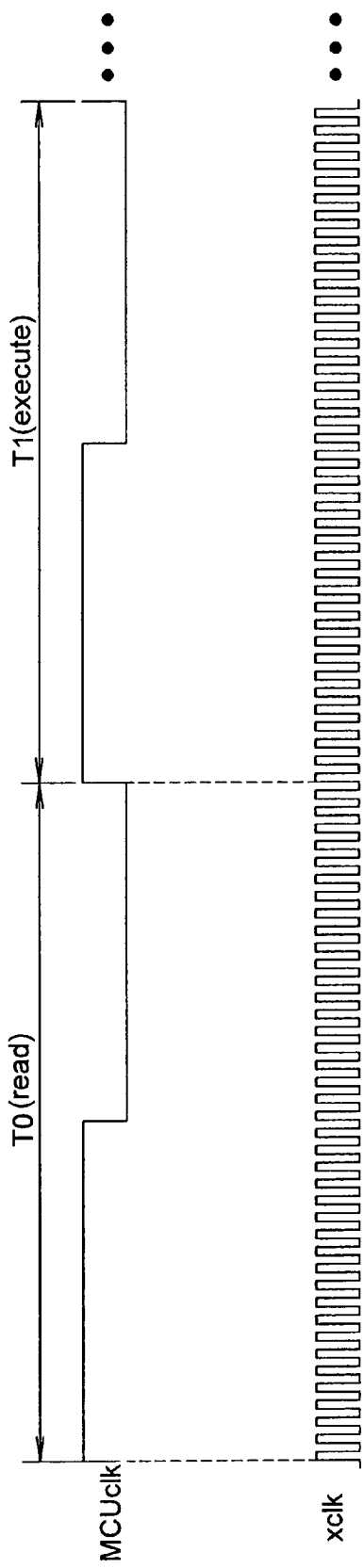
FIG. 1 shows a schematic diagram illustrating the waveform diagram of a conventional two-period (2T) microprocessor in serial transmitting operation.
Figure 2A:
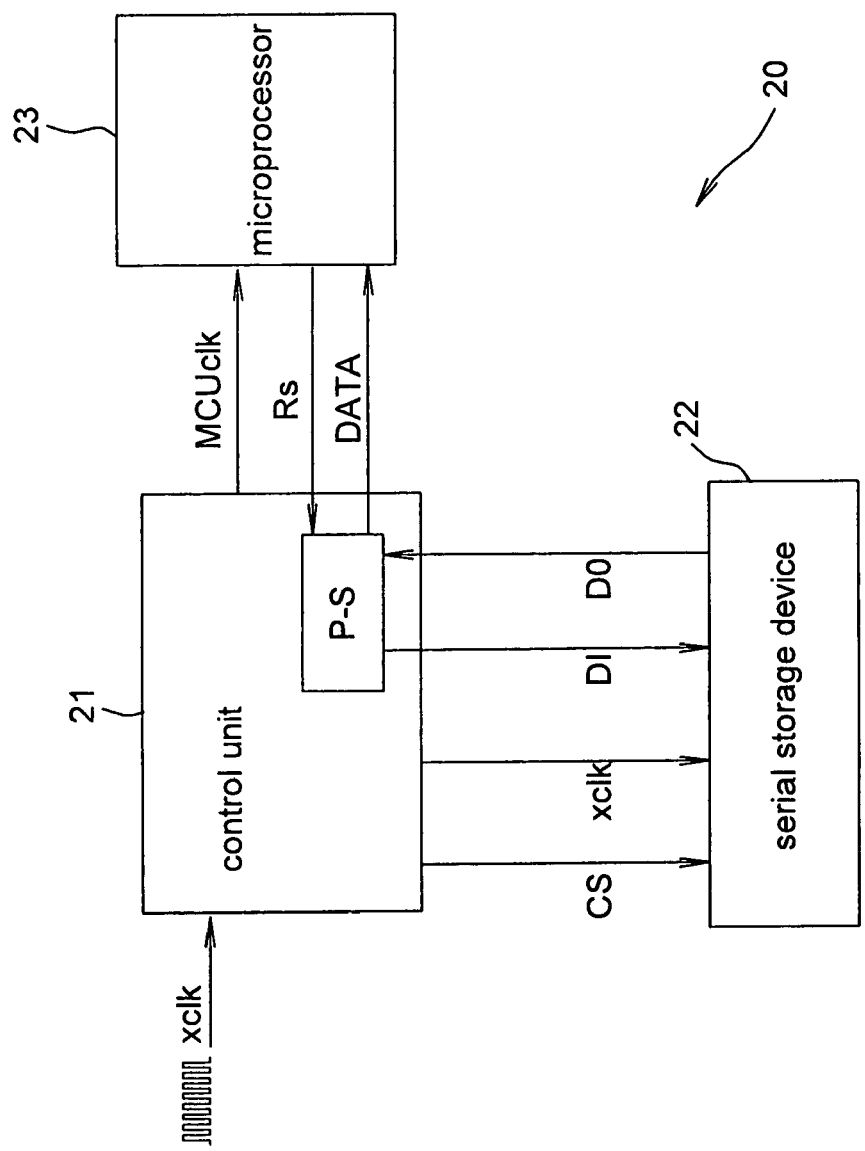
FIG. 2A shows a schematic diagram illustrating the memory control system according to one embodiment of the invention.

FIG. 2A shows a schematic diagram illustrating a memory control system 20 according to one embodiment of the invention. The memory control system 20 comprises a control unit 21, a serial storage device 22, and a microprocessor 23.

Figure 2B:
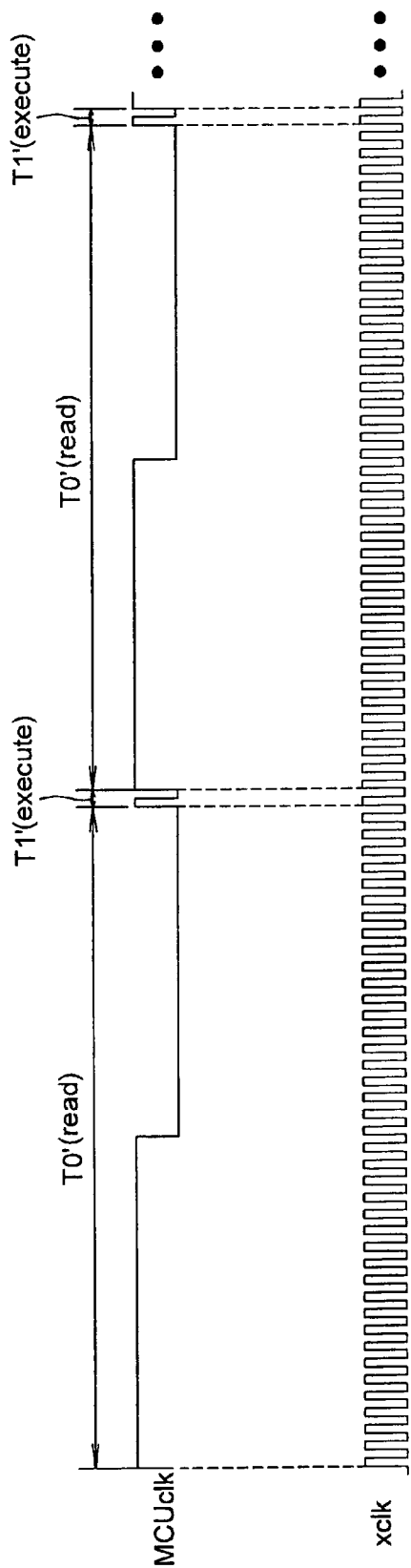
FIG. 2B shows a schematic diagram illustrating the waveform diagram of the microprocessor clock signal and a general system base band clock signal.

The control unit 21 utilizes the system base band clock signal xclk for operation and generates a microprocessor clock signal MCUclk for supplying to the microprocessor 23 according to the base band clock signal xclk. As shown in FIG. 2B, the microprocessor clock signal MCUclk comprises at least a first duration T0' and at least a second duration T1' and the second duration T1' is shorter than the first duration T0'. According to this embodiment of the invention, the microprocessor 23 outputs a read signal Rs during the first duration T0' of the microprocessor clock signal MCUclk. At the same time, the control unit 21 reads data from the serial storage device 22 according to the corresponding address provided by the read signal Rs. The control unit 21 comprises a parallel serial converting unit P-S. The parallel serial converting unit P-S is used to convert the signal, inputted in parallel from the microprocessor 23, into a serial outputting signal and to convert the data, inputted in serial from the serial storage device 22, into parallel outputting data.

The serial storage device 22 stores the data (such as ROM code) corresponding to the address requested by the microprocessor 23 to read and utilizes the system base band clock signal xclk during operation. It can be a serial read-only memory, such as a serial flash read-only memory, or other serial memories, currently available or to be developed in future.

The microprocessor 23 can be an existing two-period 2T, four-period 4T, six-period 6T, or various microprocessor control unit (MCU), or various microprocessor (MPU) to be developed in future. According to the requirements of the arithmetical operation and the microprocessor clock signal MCUclk, the microprocessor 23 generates a read signal Rs, at least comprising one address datum, during the first duration T0'. Obviously, the read signal Rs also comprises other data, such as command, etc. Referring to FIGS. 2A and 2B simultaneously, during operation, the microprocessor 23 receives the microprocessor clock signal MCUclk and outputs the read signal Rs, comprising one address datum, during the first duration T0'. At the same time, the microprocessor 23 fetches the data corresponding to the address from the serial storage device 22 during the first duration T0' and executes the operation instructed by the data during the second duration T1'.

The time required by the serial storage device 22 to process one bit during data transmission is one base band clock xclk. It is assumed that the microprocessor 23 is a two-period (2T) microprocessor in this embodiment of the invention. Then, as shown in FIG. 2B, the microprocessor 23 operates according to the unbalanced microprocessor clock signal MCUclk. The time (T0') required by the microprocessor 23 to complete reading one byte of data is the same as the time (T0) required by the prior art, that is, both are forty base band clocks xclk. However, as the execution duration, the second duration T1', set by the unbalance MCUclk is far shorter than the first duration T0', i.e. only one base band clock xclk, the time required by the microprocessor 23 to execute the one-byte data is only one xclk.

It should be noted that the effect achieved by the unbalancing design of adjusting the microprocessor clock signal MCUclk into different duration length in practice is because: by the original processing speed of a general microprocessor, the operation instructed by ROM code can be completed within one base band clock xclk and thereafter the processing speed of a general microprocessor is reduced in order to match the slower reading speed of the serial storage device. Therefore, the memory control system 20 according to one embodiment of the invention utilizes the unbalance microprocessor clock signal MCUclk to control the microprocessor 23 so that the time required for reading and executing one byte of data from the serial storage device 22 is only forty one base band clocks xclk, which are far shorter than the eighty base band clocks xclk, required by the prior art. Therefore, the memory control system 20 according to the invention can greatly increase the speed and the efficiency of fetching data from the serial storage device for the microprocessor and the problems in the prior art can be solved.

Referring to FIG. 2A, the label DI indicates the signal or data, such as command, address, and so forth, inputted from the control unit 21 to the serial storage device 22 via the P-S converting unit; the label DO indicates the ROM code data outputted from the serial storage device 22 to the P-S converting unit; and the label CS indicates the driving signal used by the control unit 21 to select which serial storage device 22 to be used when there are a plurality of serial storage devices 22 at the same time.

Figure 3:
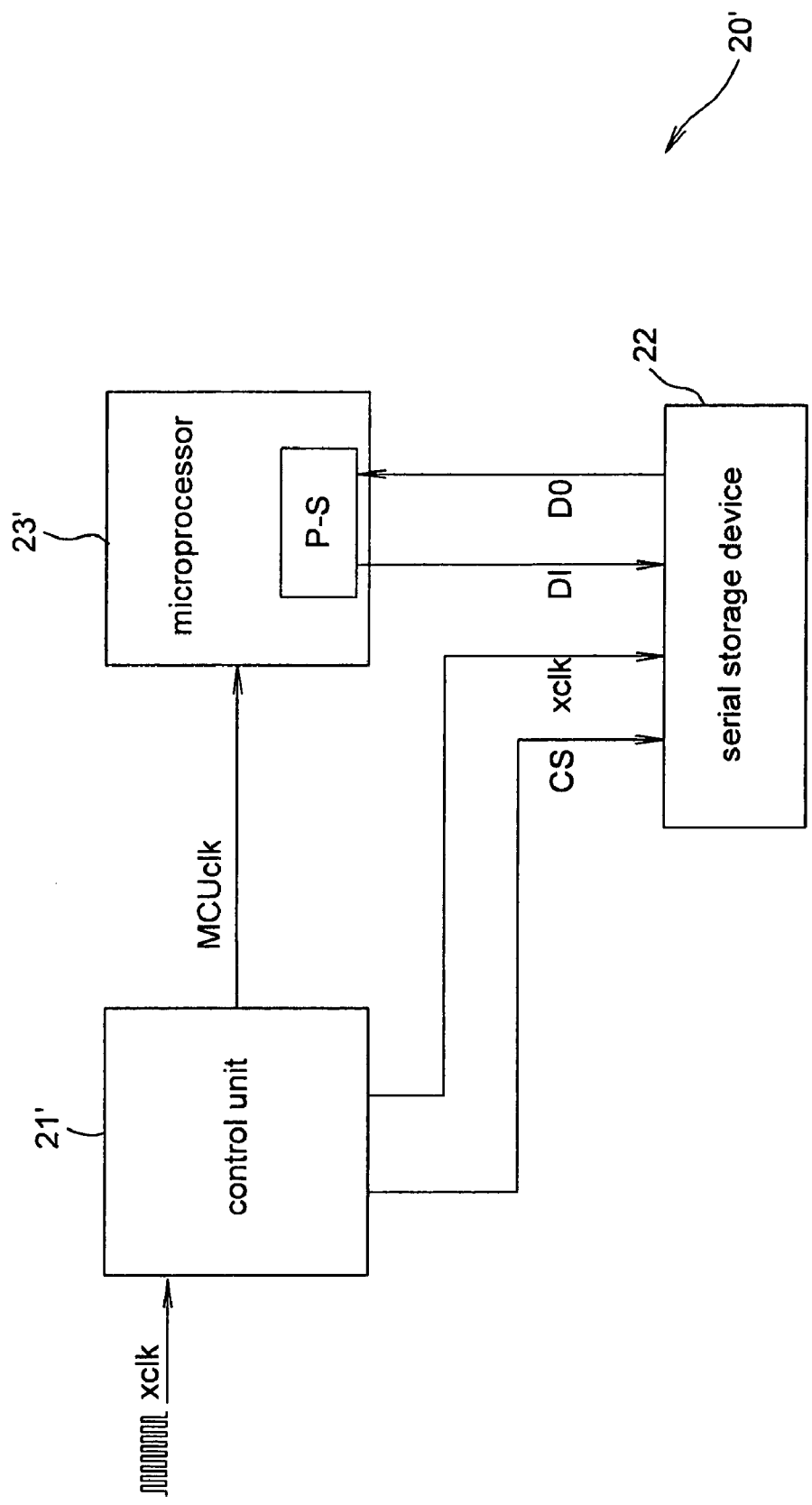
FIG. 3 shows a schematic diagram illustrating the memory control system according to another embodiment of the invention.

Furthermore, FIG. 3 shows the memory control system 20' according to another embodiment of the invention. The memory control system 20' comprises a control unit 21', a serial storage device 22, and a microprocessor 23'. The operating method of the memory control system 20' is approximately the same as that of the memory control system 20, that is, both utilize an unbalanced microprocessor clock signal MCUclk to control the operation of the microprocessor. The difference is that the control unit 21' can be implemented by a clock generator and the parallel serial converting unit P-S is built in the microprocessor 23'. Those who are skilled in the art should be able to implement accordingly to achieve the same effect of increasing the speed of reading the serial storage device by the microprocessor.

Figure 4:
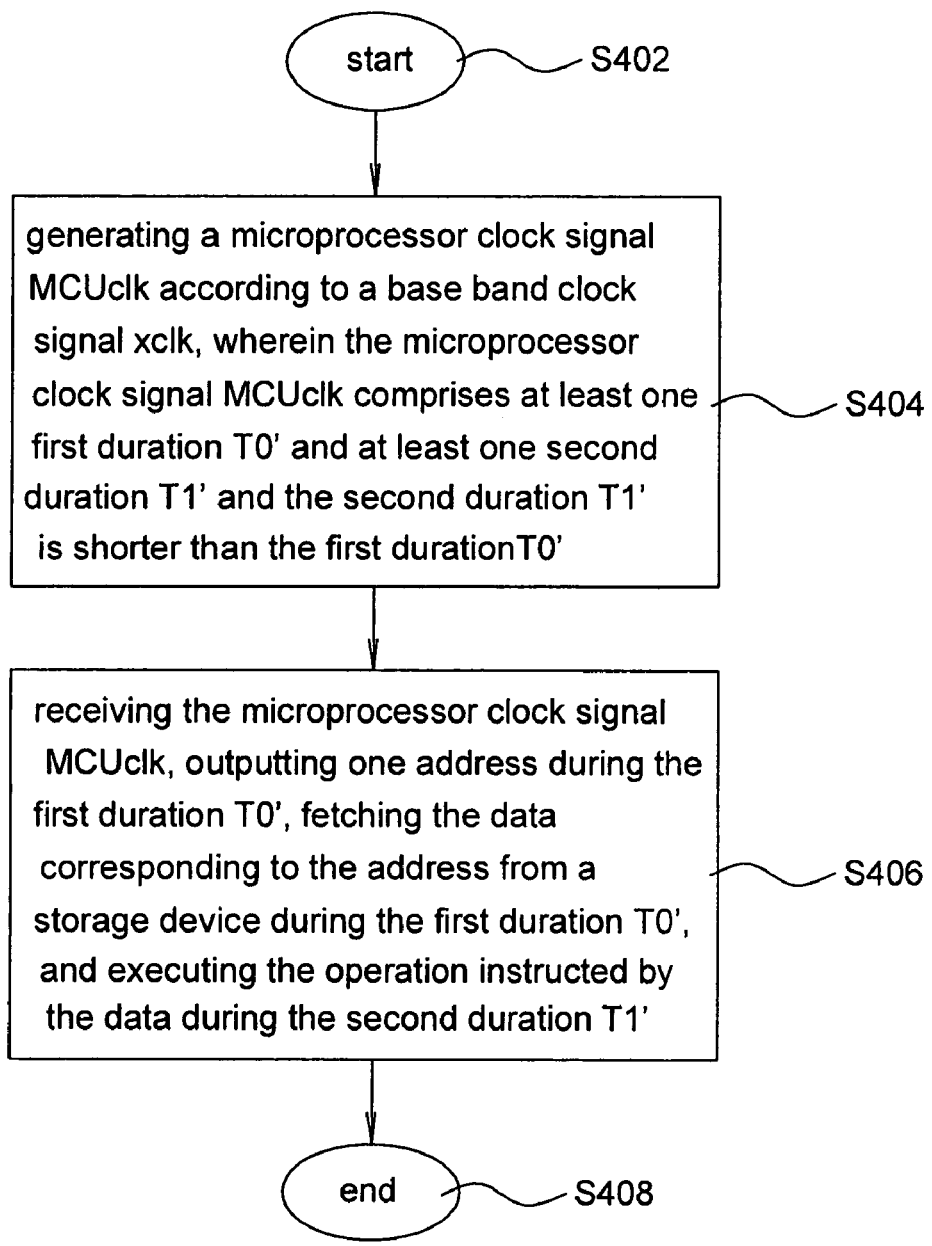
FIG. 4 shows a flow chart illustrating the method to read data from memory according to one embodiment of the invention.

FIG. 4 shows the flow chart illustrating the method to read data from memory according to one embodiment of the invention. The method comprises the following steps:

Step S402: start;

Step S404: generating a microprocessor clock signal MCUclk according to a base band clock signal xclk, wherein the microprocessor clock signal MCUclk comprises at least one first duration T0' and at least one second duration T1' and the second duration T1' is shorter than the first duration T0';

Step S406: receiving the microprocessor clock signal MCUclk, outputting one address during the first duration T0', fetching the data corresponding to the address from a storage device during the first duration T0', and executing the operation instructed by the data during the second duration T1';

Step S408: end.

It should be noted that the above-mentioned storing device can be a serial read-only memory or a serial flash read-only memory. The above-mentioned data can be read-only memory code (ROM code).

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A memory control system, the memory control system comprising:
    a control unit for generating a microprocessor clock signal according to a base band clock signal, wherein the microprocessor clock signal comprises at least a first duration and at least a second duration that is shorter than the first duration;
    a serial storage device for storing data corresponding to a plurality of addresses and operating according to the base band clock signal; and
    a microprocessor for outputting one address during the first duration according to the base band clock signal, fetching the data corresponding to the address from the serial storage device during the first duration according to the base band clock signal, and executing at least an action instructed by the data during the second duration according to the base band clock signal;
    wherein the operating frequency of the outputting one address, the fetching data and the executing at least an action are the same as the operating frequency of the serial storage device.

2. The memory control system according to claim 1, wherein the serial storage device is a serial read-only memory or a serial flash read-only memory.

3. The memory control system according to claim 1, wherein the serial storage device decodes a command and/or an address outputted by the microprocessor during the first duration to read the data corresponding to the address.

4. The memory control system according to claim 1, further comprising: a parallel serial converting unit to convert a parallel inputted signal from the microprocessor into a serial output signal and also convert a serial inputted data from the serial storage device into a parallel output data.

5. The memory control system according to claim 4, wherein the parallel serial converting unit is built in the control unit.

6. The memory control system according to claim 4, wherein the parallel serial converting unit is built in the microprocessor.

7. The memory control system according to claim 1, wherein the data are read-only memory codes.

8. A method to read data from memory, comprising:

generating a microprocessor clock signal according to a base band clock signal, wherein the microprocessor clock signal comprises at least a first duration and at least a second duration that is shorter than the first duration; and outputting one address during the first duration according to the base band clock signal, fetching data corresponding to the address from a serial storage device during the first duration according to the base band clock signal, and executing at least an action instructed by the data during the second duration according to the base band clock signal;

wherein the operating frequency of the outputting one address, the fetching data and the executing at least an action are the same as the operating frequency of the serial storage device.

9. The method according to claim 8, wherein the serial storage device is a serial read-only memory or a serial flash read-only memory.

10. The method according to claim 8, wherein the data are read-only memory codes.

* * * * *